(12) United States Patent
Utsugi

(10) Patent No.: US 8,243,158 B2
(45) Date of Patent: Aug. 14, 2012

(54) IMAGE PROCESSING DEVICE, IMAGING DEVICE, AND MEDIUM STORING IMAGE PROCESSING PROGRAM FOR INTERPOLATING AT AN AF PIXEL POSITION

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 386 days.

(21) Appl. No.: 12/320,732

(22) Filed: Feb. 3, 2009

(65) Prior Publication Data

US 2009/0207264 A1 Aug. 20, 2009

(30) Foreign Application Priority Data

Feb. 14, 2008 (JP) ................ 2008-033510
May 13, 2008 (JP) ................ 2008-126049
Jan. 23, 2009 (JP) ................ 2009-013131

(51) Int. Cl.
*H04N 5/228* (2006.01)

(52) U.S. Cl. ............ 348/222.1; 348/277; 348/345; 382/300

(58) Field of Classification Search .......... 348/222.1
See application file for complete search history.

(56) References Cited

U.S. PATENT DOCUMENTS

| 5,541,653 | A | 7/1996 | Peters et al. |
| 6,781,632 | B1 | 8/2004 | Ide |
| 6,819,360 | B1 | 11/2004 | Ide et al. |
| 2006/0146151 | A1* | 7/2006 | Moon et al. .......... 348/272 |
| 2007/0236598 | A1 | 10/2007 | Kusaka |
| 2007/0237512 | A1 | 10/2007 | Kusaka |

FOREIGN PATENT DOCUMENTS

JP A-2000-305010 11/2000

* cited by examiner

*Primary Examiner* — Sinh Tran
*Assistant Examiner* — Paul Berardesca
(74) *Attorney, Agent, or Firm* — Oliff & Berridge, PLC

(57) ABSTRACT

An image processing device including a storing unit storing the position of a focus detecting pixel of an image-capturing sensor containing plural pixels having spectroscopic characterizations corresponding to respective plural color components with the focus detecting pixel, a pixel interpolating unit generating an interpolation pixel value of the focus detecting pixel by using pixel values of pixels neighboring to the focus detecting pixel, neighborhood-pixel estimating unit calculating an estimation pixel value corresponding to a pixel value when the pixels neighboring to the focus detecting pixel have the same spectroscopic characterization as the focus detecting pixel, a high-frequency component calculating unit calculating a high frequency component of the image by using a pixel value of the focus detecting pixel and the estimation pixel value, and a high frequency component adding unit adding the interpolation pixel value with the high frequency component to calculate a pixel value of the focus detecting pixel.

20 Claims, 7 Drawing Sheets

Fig. 2

HORIZONTAL SCANNING DIRECTION →

VERTICAL SCANNING DIRECTION ↓

| R11 | G12 | R13 | G14 | R15 | G16 | R17 | G18 |
|-----|-----|-----|-----|-----|-----|-----|-----|
| G21 | B22 | G23 | B24 | G25 | B26 | G27 | B28 |
| R31 | G32 | R33 | G34 | R35 | G36 | R37 | G38 |
| X41 | Y42 | X43 | Y44 | X45 | Y46 | X47 | Y48 |
| R51 | G52 | R53 | G54 | R55 | G56 | R57 | G58 |
| G61 | B62 | G63 | B64 | G65 | B66 | G67 | B68 |
| R71 | G72 | R73 | G74 | R75 | G76 | R77 | G78 |

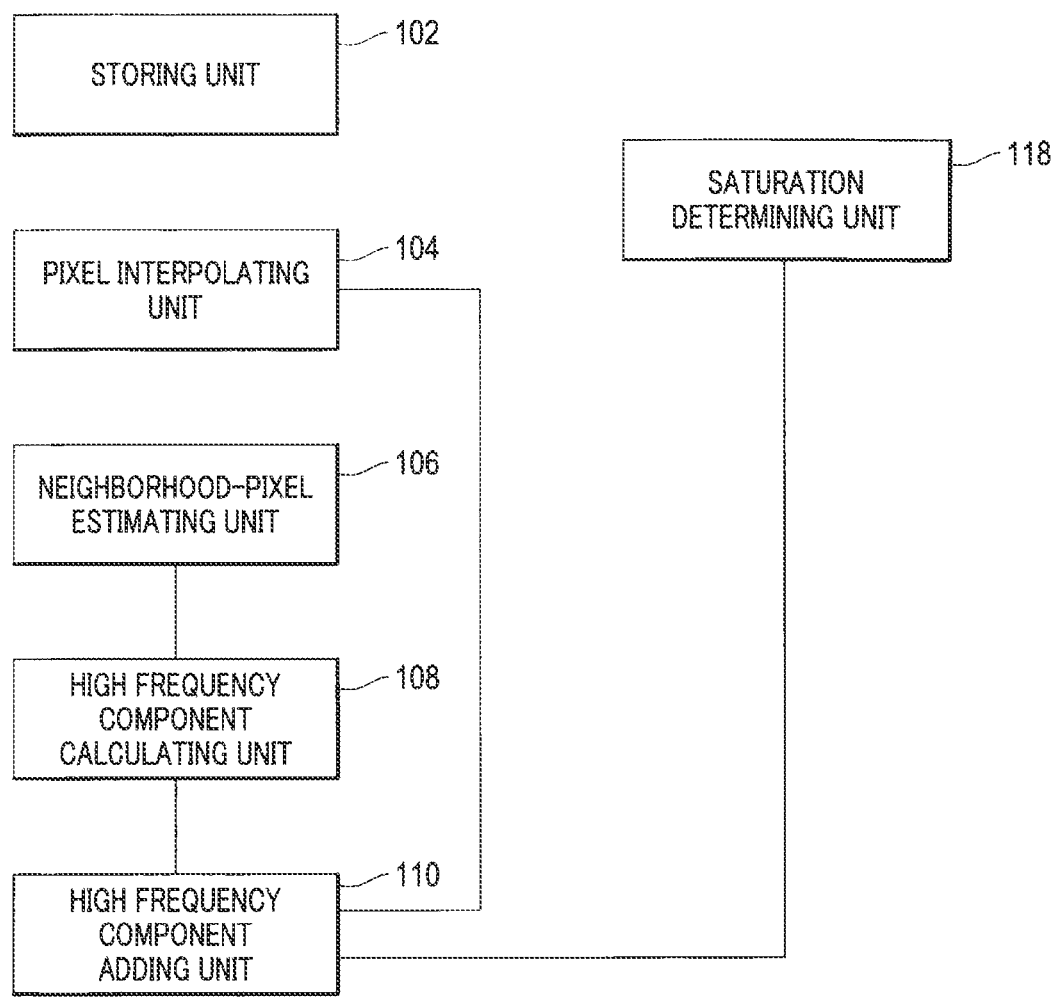

IMAGE PROCESSING DEVICE, IMAGING DEVICE, AND MEDIUM STORING IMAGE PROCESSING PROGRAM FOR INTERPOLATING AT AN AF PIXEL POSITION

CROSS REFERENCE TO THE RELATED APPLICATIONS

This application is based upon and claims the benefit of priorities from Japanese Patent Application Nos. 2008-033510, 2008-126049, and 2009-013131, each filed on Feb. 14, 2008, May 13, 2008, and Jan. 23, 2009, the entire contents of which are incorporated herein by reference.

BACKGROUND

1. Field

The present application relates to an image processing device, an imaging device and an image processing program.

2. Description of the Related Art

There is known an image-capturing sensor in which focus detecting pixels are arranged in a partial area of a light receiving face and a detection signal for detecting the focus state of a subject image based on the focus detecting pixels is output simultaneously with outputting of an image signal of a subject image shot by pixels (for example, Patent Document 1).

The Patent Document 1 discloses a technique of determining pixel values of pixels in the neighborhood of the focus detecting pixels to interpolate pixels values for imaging at the positions of the focus detecting pixels by simple average.

Patent Document 1: Japanese Unexamined Patent Application Publication No. 2000-305010

However, according to the interpolation method based on the simple average of the Patent Document 1 as a prior art, when there is an outline of a subject or a structure such as a fine line structure or the like in a neighboring area of a focus detecting pixel to be interpolated, there are problems that these structures are vanished, a false color or a false structure occurs, or the image quality of an image is deteriorated.

SUMMARY

It is a proposition of the present application to provide a technique that can interpolate pixel values for imaging with high precision even when there is an outline, a fine line structure or the like at the position of a focus detecting pixel.

An image processing device includes a storing unit 102 (see FIG. 6 for example) storing the position of a focus detecting pixel of an image-capturing sensor which contains a plurality of pixels having spectroscopic characterizations corresponding to respective a plurality of color components and the focus detecting pixel having spectroscopic characterization different from the spectroscopic characterizations of the plurality of the pixels, a pixel interpolating unit 104 generating an interpolation pixel value of the focus detecting pixel by using a pixel value of one of pixels in the neighborhood of the focus detecting pixel in an image generated by the image-capturing sensor, a neighborhood-pixel estimating unit 106 calculating an estimation pixel value corresponding to a pixel value when one of the pixels in the neighborhood of the focus detecting pixel has the same spectroscopic characterization as the focus detecting pixel, a high-frequency component calculating unit 108 calculating a high frequency component of the image by using a pixel value of the focus detecting pixel and the estimation pixel value, and a high frequency component adding unit 110 adding the interpolation pixel value with the high frequency component to calculate a pixel value of the focus detecting pixel for imaging.

Furthermore, the storing unit may store weight coefficients for representing the spectroscopic characterization of the focus detecting pixel by the weighted sum of the respective spectroscopic characterizations of the plurality of the pixels, and the neighborhood-pixel estimating unit may calculate the weighted sum by using the weight coefficients and the pixel values of the plurality of the pixels in the neighborhood of the focus detecting pixel, thereby calculate the estimation pixel value.

Still furthermore, the neighborhood-pixel estimating unit calculates a pixel value when one of the pixels in the neighborhood of the focus detecting pixel may have a color component different from a color component of one of the pixels in the neighborhood of the focus detecting pixel, and calculates the estimation pixel value by using the calculated pixel value and the pixel value of one of the pixels in the neighborhood of the focus detecting pixel.

Still furthermore, the focus detecting pixel is plural in number and subjects an imaging optical system to pupil split, and the high frequency component calculating unit may use, as the pixel value of the focus detecting pixel, an addition pixel value obtained by adding the pixel value of the focus detecting pixel with a pixel value of another focus detecting pixel having pupil split different from pupil split of the focus detecting pixel.

Still furthermore, the high frequency component calculating unit may further include a color fluctuation calculating unit calculating a color fluctuation value corresponding to a magnitude of a fluctuation of each of pixel values of the plurality of the color components with respect to each of the color components by using the plurality of the pixels in the neighborhood of the focus detecting pixel, and the high frequency component calculating unit may calculate a high frequency component of the focus detecting pixel by using the color fluctuation value.

Still furthermore, the high frequency component calculating unit may calculate a color component fluctuation rate corresponding to the rate of the color fluctuation value of one color component and a comprehensive value of the color fluctuation values of all the color components, adjust the high frequency component of the image in accordance with the color component fluctuation rate, and may calculate a high frequency color component corresponding to the high frequency component of the image when the focus detecting pixel has a spectroscopic characterization of the one color component, and the high frequency component adding unit may add the interpolation pixel value with the high frequency color component and calculates the pixel value of the focus detecting pixel for imaging.

Still furthermore, the color fluctuation calculating unit may calculate a color fluctuation value of a first color component by determining a dispersion of pixel values of the plurality of the pixels having the first color component in the neighborhood of the focus detecting pixel, and may determine a dispersion of pixel values of a plurality of pixels having a second color component larger than a pixel density of the plurality of the pixels having the first color component in the neighborhood of the focus detecting pixel as a dispersion of values obtained by interpolating pixel values of a plurality of focus detecting pixels having the second color component at the respective pixel positions of the plurality of the pixels having the first color component, thereby calculates a color fluctuation value of the second color component.

Still furthermore, the high frequency component adding unit may suppress an addition of the high frequency component when a magnitude of the high frequency component is smaller than a predetermined value.

Still furthermore, the predetermined value may be a maximum value of an estimation error of a high frequency component in a flat area in which a variation rate of pixel values of the plurality of the pixels is small.

Still furthermore, the image processing device may further include a directional fluctuation calculating unit calculating, by using the pixel values of the plurality of the pixels in the neighborhood of the focus detecting pixel, a directional fluctuation corresponding to a variation rate of the pixel values with respect to each of a plurality of the directions, wherein the pixel interpolating unit calculates the interpolation pixel value from a pixel value of a pixel located in a direction having the smallest directional fluctuation with respect to the focus detecting pixel.

Still furthermore, the focus detecting pixel may be one-dimensionally arranged in a predetermined array direction, and the high frequency component adding unit may suppress an addition of the high frequency component when the directional fluctuation in a direction intersecting to the array direction is smaller than a predetermined value.

Still furthermore, the focus detecting pixel is plural in number and one-dimensionally arranged in a predetermined array direction, and the high frequency component adding unit may suppress an addition of the high frequency component when the directional fluctuation in the array direction is larger than a predetermined value.

Still furthermore, the image processing device may further include an optical information obtaining unit 112 (see FIG. 6 for example) obtaining information concerning an optical system used to shoot the image, and a pixel value adjusting unit 114 adjusting at least one of the pixel value of the focus detecting pixel and the estimation pixel value in accordance with the optical information, wherein the high frequency component calculating unit 108 calculates the high frequency component of the image by using the pixel value of the focus detecting pixel and the estimation pixel value at least one of which is adjusted by the pixel value adjusting unit 114.

Still furthermore, the image processing device may further include an optical information obtaining unit 112 (see FIG. 7 for example) obtaining information concerning an optical system used to shoot the image, and a weight coefficient adjusting unit 116 adjusting the weight coefficients in accordance with the optical information.

Still furthermore, the optical information obtaining unit may obtain at least one of an F-value, a PO value and a focus detecting pixel position of the optical system.

Still furthermore, the image processing device may further include a saturation determining unit 118 (see FIG. 8 for example) determining one of saturation of the pixel value of the focus detecting pixel and the pixel value of the pixel in the neighborhood of the focus detecting pixel, wherein the high frequency component adding unit 110 suppresses an addition of the high frequency component in accordance with a determination result of the saturation determining unit 118.

Still furthermore, the high frequency component adding unit may suppress an addition of the high frequency component when it is determined by the saturation determining unit that the pixel value of the focus detecting pixel is saturated and also the high frequency component is negative.

Still furthermore, the high frequency component adding unit may suppress an addition of the high frequency component when it is determined by the saturation determining unit that the pixel value of the pixel in the neighborhood of the focus detecting pixel is saturated and also the high frequency component is positive.

An image-capturing device according to the present application includes an image-capturing sensor and the image processing device according to the present application.

Still furthermore, a computer readable medium storing an image processing program according to the present application causes a computer to implement a calculation of the image processing device according to the present invention.

According to the present application, pixel values for imaging can be interpolated with high precision even when an outline, a fine line structure or the like exists at the position of a focus detecting pixel.

BRIEF DESCRIPTION OF THE DRAWINGS

FIG. 2 is a diagram showing the array of cells of an image-capturing sensor.

FIG. 8 is a block diagram of an image processing device according to an embodiment of the disclosure.

DETAILED DESCRIPTION OF THE EMBODIMENTS

Figure 1:
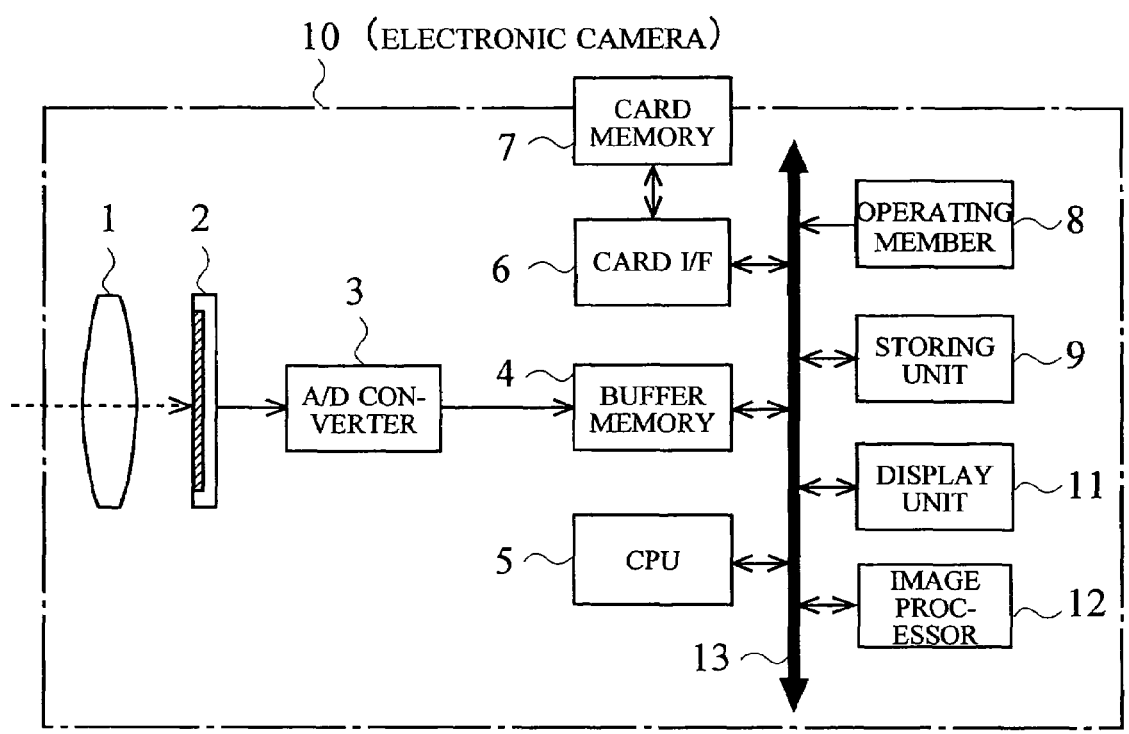
FIG. 1 is a block diagram showing the structure of an electronic camera 10 according to an embodiment of the present invention.

FIG. 1 is a diagram showing the construction of an electronic camera 10 according to an embodiment of the present invention.

The electronic camera 10 has an imaging lens 1, an image-capturing sensor 2, an A/D converter 3, a buffer memory 4, CPU 5, a card interface (card I/F) 6, an operating member 8, a storing unit 9, a display unit 11 and an image processor 12. The buffer memory 4, CPU 5, the card I/F 6, the operating member 8, the storing unit 9, the display unit 11 and the image processor 12 are coupled to one another through a bus 13 so that information can be transmitted among them. FIG. 1 shows only the main part of the electronic camera 10. A timing generator that emits a timing pulse of an imaging instruction to the image-capturing sensor 2 and the A/D converter 3 in accordance with an instruction of CPU 5, etc. are omitted according to the illustration of FIG. 1.

The imaging lens 1 is made up of plural optical lenses, and focuses a subject image onto a light receiving face of the image-capturing sensor 2.

The image-capturing sensor 2 appropriately selects and uses a semiconductor image sensor of CCD or CMOS or the like in which a primary color transmissible filter of any color of R (red), G (green) and B (blue) is arranged in a Bayer array style for each of plural pixels on the light receiving face. Furthermore, the image-capturing sensor 2 of this embodiment has plural focus detection pixels (AF pixels) arranged one-dimensionally in a horizontal scanning direction in a partial area on the light receiving face. The primary color transmissible filters of the pixels are not disposed on the AF pixels, and there exist two kinds of AF pixels that receive light fluxes passing through the left and right sides of the pupil of the optical system of the imaging lens 1, respectively. Accordingly, each of the AF pixels in this embodiment outputs a pupil-split detection signal of left side or right side which corresponds to the brightness of white light. FIG. 2 shows a part of image data picked up by the image-capturing sensor 2, which contains an AF-pixel arranged area as a center. Each cell represents one pixel. The symbols R, G and B at the head of each cell represent the pixel having each primary color transmissible filter. The symbols X and Y represent AF pixels having sensitivity to light fluxes from the left side and the right side, respectively, and these AF pixels are alternately one-dimensionally arranged in the horizontal scanning direction. The number of two digits subsequent to each symbol represents the position of the pixel.

This image-capturing sensor 2 operates according to a timing pulse generated by a timing generator (not shown) in response to an instruction from CPU 5 to obtain a subject image focused by the imaging lens 1 provided at the front side thereof. An image signal output from the image-capturing sensor 2 is converted to a digital signal in the A/D converter 3. The digital image signal is temporarily recorded in a frame memory (not shown), and then recorded in the buffer memory 4. Any non-volatile memory out of semiconductor memories may be appropriately selected and used as the buffer memory 4.

When the electronic camera 10 is powered on upon operation of a power supply button of the operating member 8 by a user, CPU 5 reads a control program or an image processing program stored in the storing unit 9 and initializes the electronic camera 10. When accepting an instruction from the user through the operating member 8, CPU 5 outputs an imaging instruction of the subject to the timing generator (not shown), makes the image processor 12 execute the image processing on the obtained image and controls recording of the processed image into a card memory 7, display of the processed image on the display unit 11, etc. in response to the control program. CPU for a general computer may be used as CPU 5.

The card memory 7 is detachably mounted in the card I/F 6. An image recorded in the buffer memory 4 is subjected to the image processing in the image processor 12 in response to the instruction of CPU 5, and then recorded as a file based on JPEG style or YUV style in the card memory 7.

The operating member 8 outputs an operation signal corresponding to the operation content thereof by the user to CPU 5. The operating member 8 has operating parts such as a power supply button, mode setting buttons for an imaging mode, etc., a release button, etc. The operating member 8 may be touch-panel type buttons displayed on the screen of the display unit 11 described later.

The storing unit 9 records image data picked up by the electronic camera 10, and stores various kinds of programs such as a control program for controlling the electronic camera 10 by CPU 5, an image processing program to be executed in the image processor 12, etc. Furthermore, the storing unit 9 also stores data of position information of AF pixels of the image-capturing sensor 2, and data such as various kinds of threshold values, addition coefficients, etc. which are determined in advance and used for the image processing program. The programs and the data stored in the storing unit 9 can be appropriately referred to from CPU 5 through a bus 13. As the storing unit 9 may be appropriately used a storage device such as a general hard disk device, a magnetooptical disk device or the like.

The display unit 11 displays a through image, a pickup image, a mode setting screen, etc. A liquid crystal monitor or the like may by appropriately used as the display unit 11.

The image processor 12 is a digital front-end circuit for executing image processing such as edge enhancement processing, white balance correction, etc. in response to an image processing instruction of CPU 5 and also executes interpolation calculation on pixel values at the pixel positions of the AF pixels.

Next, the electronic camera 10 according to this embodiment will be described with reference to the flowchart of FIG. 3.

When the power supply button of the operating member 8 is pushed by the user, CPU 5 reads the control program and the image processing program stored in the storing unit 9 of the electronic camera 10, and initializes the electronic camera 10. CPU 5 is kept on standby until an imaging instruction of a subject is output from the user. When the release button of the operating member 8 is pushed by the user, CPU 5 judges that the imaging instruction is output, and executes the processing of step S10 to step S23. In this embodiment, the primary color transmissible filters disposed on the respective pixels are arranged in a Bayer array pattern. Therefore, the pixel value of green color (G) is interpolated at the position of the AF pixel of the symbol X, and the pixel value of blue color (B) is interpolated at the pixel position of the AF pixel of the symbol Y. In the following description, the pixel value of the blue color of Y44 and the pixel value of the green color of X45 are respectively interpolated. The same procedure is applied to the interpolation of the pixel values of the other AF pixels.

In step S05, an optical information obtaining unit obtains information concerning the optical system. For example, the optical information obtaining unit may obtain at least one of an F-value, a PO value and a focus detecting pixel position of the optical system.

In step S11, CPU 5 reads the image data achieved in step S10 from the buffer memory 4, and also reads the data of the position information of the AF pixels and threshold values and the addition coefficients described later from the storing unit 9. CPU 5 transmits the image data, the position information of the AF pixels, the threshold values and the addition coefficients through the bus 13 to the image processor 12, and calculates the pixel values at the positions of the AF pixels by the interpolation calculation in addition to the image processing such as the edge enhancement processing, the white balance correction, etc. In order to interpolate the pixel values at the AF pixels of X45 and Y44, the image processor 12 calculates the values of directional fluctuation H1 to H4 corresponding to fluctuation rates of the pixel values in the four direction by using the pixel values of the pixels around X45 and Y44 according to the following equations (1) to (4). The four directions in this embodiment correspond to the horizontal scanning direction, the vertical scanning direction, and directions intersecting to the horizontal scan direction at 45° and 135°.

The directional fluctuation $H1$ in the horizontal scanning direction $=2\times(|G34-G36|+|G54-G56|)+|R33-R35|+|R53-R55|+|B24-B26|+|B64-B66|$ (1)

The directional fluctuation $H2$ in the vertical scanning direction $=2\times(|G34-G54|+|G36-G56|)+|R33-R53|+|R35-R55|+|B24-B64|+|B26-B66|$ (2)

The directional fluctuation $H3$ intersecting to the horizontal scanning direction at 45° $=2\times(|G27-G36|+|G54-G63|)+|R35-R53|+|R37-R55|+|B26-B62|+|B28-B64|$ (3)

The directional fluctuation $H4$ intersecting to the horizontal scanning direction at 135° $=2\times(|G23-G34|+|G56-G67|)+|R33-R55|+|R35-R57|+|B22-B66|+|B24-B68|$ (4)

In step S12, the image processor 12 selects the direction of the directional fluctuation having the smallest value among the directional fluctuations H1 to H4 determined in step S11, and calculates the pixel value $G_{X45}$ of G at the position of the AF pixel X45 and the pixel value $B_{Y44}$ of B at the position of the AF pixel Y44 by using the pixel values of the pixels in the direction concerned according to the equation corresponding to the selected direction out of the equations (5) to (8). Accordingly, the pixel values at the positions of the AF pixels of X45, Y44, etc. can be more accurately interpolated by using the pixel values in the direction having the small fluctuation.

When the directional fluctuation H1 is smallest, $$B_{Y44}=(B24+B64)/2$$

$$G_{X45}=(G34+G36+G54+G56)/4 \quad (5)$$

When the directional fluctuation H2 is smallest, $$B_{Y44}=(B24+B64)/2$$

$$G_{X45}=(G25+G65)/2 \quad (6)$$

When the directional fluctuation H3 is smallest, $$B_{Y44}=(B26+B62)/2$$

$$G_{X44}=(G36+G54)/2 \quad (7)$$

When the directional fluctuation H4 is smallest, $$B_{Y44}=(B22+B66)/2$$

$$G_{X45}=(G34+G56)/2 \quad (8)$$

In step S13, the image processor 12 calculates the directional fluctuation H5 of the pixel value of the AF pixel in the horizontal scanning direction corresponding to the array direction of the AF pixels by using the pixel values W44 and W45 of white light of Y44 and X45 of the AF pixels and the following equation (9), for example.

$$H5=|W44-W45| \quad (9)$$

The image processor 12 judges whether the value of the directional fluctuation H5 is larger than a threshold value th1. If the directional fluctuation H5 is larger than the threshold value th1 (YES side), the image processor 12 updates the image data by setting the interpolated values of $B_{Y44}$ and $G_{X45}$ calculated in step S12 as the pixel values of the pixels at Y44 and X45. The image processor 12 records the updated image data through the bus 13 into the buffer memory 4, and shifts the processing to step S23. On the other hand, if the directional fluctuation H5 is not more than the threshold value th1 (NO side), the image processor 12 shifts the processing to step S14. The threshold value th1 may be set to a value of about 512 when 12-bit image is processed.

In step S14, the image processor 12 judges whether the value of the directional fluctuation H2 calculated in step S11 is smaller than a threshold value th2. If H2 is smaller than the threshold value th2 (YES side), the image processor 12 updates the image data by setting the interpolated values of $B_{Y44}$ and $G_{X45}$ calculated in step S12 as the pixel values of the pixels at Y44 and X45. The image processor 12 records the updated image data through the bus 13 into the buffer memory 4, and shifts the processing to step S23. On the other hand, if the directional fluctuation H2 is not more than the threshold value th2 (NO side), the image processor 12 shifts the processing to step S15. The threshold value th2 may be set to a value of about 64 when 12-bit image is processed.

In step S15, the image processor 12 calculates the average pixel value <W44>, etc. of white light at the AF pixels of Y44, etc. which have sensitivity to a light flux from the right side by using the pixel values of pixels of color components R, G and B which are located in the neighborhood of the AF pixels. Specifically, in step S12, for example when the image processor 12 judges that the directional fluctuation H2 is smallest, B24 and B64 in the equation (6) are used as the pixel values of the pixels of B. Furthermore, with respect to the pixel values of R and G, the pixel values of R and G at the positions of the pixels B24 and B64 of B are interpolatively calculated by using four equations of the following equation (10).

$$R_{B24}=(R13+R15+R33+R35)/4$$

$$G_{B24}=(G14+G23+G25+G34)/4$$

$$R_{B64}=(R53+R55+R73+R75)/4$$

$$G_{B64}=(G54+G63+G65+G74)/4 \quad (10)$$

The image processor 12 calculates the pixel values W24 and W64 of white light at the positions of the pixels B24 and B64 by using weight coefficients WR, WG and WB of R, G and G transmitted from CPU 5 according to the weighted sum of the equation (11). The calculation method of the weighted coefficients WR, WG and WB will be described later.

$$W24=WR \times R_{B24}+WG \times G_{B24}+WB \times B24$$

$$W64=WR \times R_{B64}+WG \times G_{B64}+WB \times B64 \quad (11)$$

The image processor 12 calculates the average pixel value <W44> of white light at Y44=(W24+W64)/2.

In step S16, the image processor 12 calculates the average pixel value <W45>, etc. of white light at the AF pixels of X45, etc. having sensitivity to the light flux from the left side by using the pixel values of the pixels of color components R, G and B in the neighborhood of the AF pixels concerned as in the case of the step S15. In step S12, when the image processor 12 judges that the directional fluctuation H2 is smallest, G25 and G65 in the equation (6) are used as the pixel values of the pixels of G. With respect to the pixel values of R and B, the pixel values of R and B at the positions of the pixels G25 and G65 of G are interpolatively calculated by using four equations of the following equation (12).

$$R_{G25}=(R15+R35)/2$$

$$B_{G25}=(B24+B26)/2$$

$$R_{G65}=(R55+R75)/2$$

$$B_{G65}=(B64+G66)/2 \quad (12)$$

The image processor 12 calculates the pixel values W25 and W65 of white light at the positions of the pixels G25 and G65 according to the weighted sum of the equation (13).

$$W25=WR \times R_{G25}+WG \times G25+WB \times B_{G25}$$

$$W65=WR \times R_{G64}+WG \times G25+WB \times B_{G65} \quad (13)$$

The image processor 12 calculates the average pixel value <W45> of white light at X45=(W25+W65)/2.

In step S17, the image processor 12 calculates a high-frequency component of the pixel value of white light at each AF pixel of the image-capturing sensor 2 by using the average pixel value of white light determined in step S15 and step S16. The image processor 12 first calculates the average pixel value of white light at the pixel position of each AF pixel from the pixel value of each AF pixel of the image-capturing sensor 2. That is, the pixel value of each AF pixel is a value obtained by subjecting the light flux from the left side or the right side to pupil split. Accordingly, in order to obtain the pixel value of white light at the position of each AF pixel, it is necessary to add the pixel values of light fluxes from the right and left sides. Therefore, the image processor 12 of this embodiment calculates the average pixel value of white light at the positions of the AF pixels Y44 and X45 like the following equation (14), for example, by using the pixel value of each AF pixel and the pixel value of adjacent AF pixel.

$$<W44>'=W44+(W43+W45)/2$$

$$<W45>'=W45+(W44+W46)/2 \quad (14)$$

The image processor 12 calculates the high-frequency components $HF_{Y44}$ and $HF_{X45}$ of white light at the positions of Y44 and Y45 from the following equation (15).

$$HF_{Y44}=<W44>'-<W44>$$

$$HF_{X45}=<W45>'-<W45> \quad (15)$$

In step S18, the image processor 12 judges whether the occupation rate of the high-frequency component HF of the pixel value of white light at the position of each AF pixel determined in step S17 in the pixel value of the white light is smaller than a threshold value th3 (for example, about 10% in this embodiment). If the high-frequency component HF is smaller than the threshold value th3 (YES side), the image processor 12 updates the image data by setting the interpolated values of $B_{Y44}$ and $G_{X45}$ determined in step S12 as the pixel values at Y44 and X45. The image processor 12 records the updated image data through the bus 13 into the buffer memory 4, and shifts the processing to step S23. On the other hand, when the high-frequency component HF is not less than the threshold value th3 (NO side), the image processor 12 shifts the processing to step S19. The description of the value of the threshold value th3 will be made later together with the description of the weight coefficients WR, WG and WB.

In step S19, the image processor 12 calculates the color variations VR, VGr, VB and VGb of the pixel values of the pixels of the respective colors R, G and B in the neighborhood of Y44 and X45. Here, the color variations VGr and VGb represent the color variation of G at the position of the pixel of R or B. The image processor 12 calculates the color variations VR and VGr according to the two equations of the following equation (16).

$$VR=|R33-R53|+|R35-R55|+|R37-R57|$$

$$VGr=|(G32+G34)/2-(G52+G54)/2|+|(G34+G36)/2-(G54+G56)/2|+|(G36+G38)/2-(G56+G58)/2| \quad (16)$$

The image processor 12 of this embodiment calculates the value of VGr after calculating the average value of the pixel value of G at the positions R33, R35, R37, R53, R55 and R57 of the pixels of R. Furthermore, the image processor 12 calculates the color variations VB and VGb according to the two equations of the following equation (17).

$$VB=|B22-B62|+|B24-B64|+|B26-B66|$$

$$VGb=|(G21+G23)/2-(G61+G63)/2|+|(G23+G25)/2-(G63+G63)/2|+|(G25+G27)/2-(G65+G67)/2| \quad (17)$$

The image processor 12 of this embodiment calculates the value of VGb after calculating the average value of the pixel values of G at the positions B22, B24, B26, B62, B64 and B66 of the pixels of B.

In step S20, the image processor 12 calculates the color fluctuation rates $K_{WG}$ and $K_{WB}$ to while light of the color components G and B by using the color variations VR, VGr, VB and VGb calculated in step S19. First, the image processor 12 calculates the color variations VR2, VG2 and VB2 of the following equation (18) from the color variations VR, VGr, VB and VGb.

$$VR2=(VR+\alpha)\times(VGb+\alpha)$$

$$VB2=(VB+\alpha)\times(VGr+\alpha)$$

$$VG2=(VGb+\alpha)\times(VGr+\alpha) \quad (18)$$

Here, α represents an appropriate constant for stabilizing the value of the color fluctuation rate, and when 12-bit image is processed, it may be set to a value of about 256.

The image processor 12 calculates the color variation VW to white light in the following equation (19) by using the color variations VR2, VG2 and VB2.

$$VW=VR2+VG2+VB2 \quad (19)$$

Accordingly, the image processor 12 calculates the color fluctuation rates $K_{WG}$ and $K_{WB}$ from the following equation (20).

$$K_{WB}=VG2/VW$$

$$K_{WB}=VB2/VW \quad (20)$$

In step S21, the image processor 12 calculates the high-frequency components of the pixel values of the color components G and B at the position of each AF pixel from the following equation (21) by using the high-frequency component HF of the pixel value of white light at the position of each AF pixel determined in step S17 and the color fluctuation rates $K_{WG}$ and $K_{WB}$ calculated in the step S20.

$$HFB_{Y44}=HF_{Y44}\times K_{WB}$$

$$HFG_{X45}=HF_{X45}\times K_{WG} \quad (21)$$

In step S22, the image processor 12 adds the high-frequency component of each color component at each AF pixel determined in step S21 to the pixel value of the pixel interpolated in step S12. CPU 5 calculates the pixel values B' and G' of Y44 and X45 according to the following equation (22), for example.

$$B'_{Y44}=B_{Y44}+HF_{Y44}$$

$$G'_{X45}=G_{X45}+HF_{X45} \quad (22)$$

The image processor 12 updates the image data by setting the pixel values of B'$_{Y44}$, G'$_{X45}$, etc. interpolated at the positions of the AF pixels of Y44, X45, etc. as the pixel values of the pixels at these positions. The image processor 12 records the updated image data through the bus 13 into the buffer memory 4.

IN step S23, CPU 5 sets the image data in the buffer memory 4 as a file based on JPEG style, YUV style or the like, records the file into the card memory 7 through the bus 13 and the card I/F 6, and then finishes a series of works.

Next, the calculation method of the weight coefficients WR, WG and WB will be described together with the threshold value th3.

When the weight coefficients and the threshold value are determined, the image-capturing sensor 2 to be installed into a product or an image-capturing sensor having the same function as the image-capturing sensor 2 is prepared. Illumination having substantially uniform luminance is applied to the image-capturing sensor 2 while the wavelength band of the illumination is variously changed, thereby obtaining pickup image data of respective wavelength bands. Furthermore, with respect to the pickup image data n of each wavelength band, the pixel values of AF pixels of different pupil splits are added as in the case of the equation (14), thereby calculating the pixel value Wn of white light. At the same time, the same is also applied to the pixel values Rn, Gn, Bn of pixels of respective color components in the neighborhood of the AF pixel.

A square error E as a function of unknown weight coefficients WR, WG and WB is defined as follows.

$$E=\Sigma_n(WR\times Rn+WG\times Gn+WB\times Bn-Wn)^2$$

Here, the weight coefficients WR, WG and WB that minimize E are calculated (each of WR, WG and WB is partially differentiated by E, and the weight coefficients WR, WG and WB when the partially differentiated values of WR, WG and WB are respectively equal to zero are calculated). By calculating the weight coefficients WR, WG and WB as described above, the weight coefficients with which the spectroscopic characterization of the AF pixel is represented by the weighted sum of the spectroscopic characterizations of the pixels of the respective color components R, G and B are calculated. The thus-calculated weight coefficients WR, WG and WR are recorded in the storing unit 9 of the electronic camera 10.

Furthermore, the error rate Kn for each pickup image data n is calculated based on the calculated weight coefficients WR, WG and WB according to the following equation.

$$Kn=|WR\times Rn+WG\times Gn+WB\times Bn-Wn|/Wn$$

The maximum value of Kn is calculated, and recorded as the threshold value th3 in the storing unit 9 of the electronic camera 10.

Figure 4:
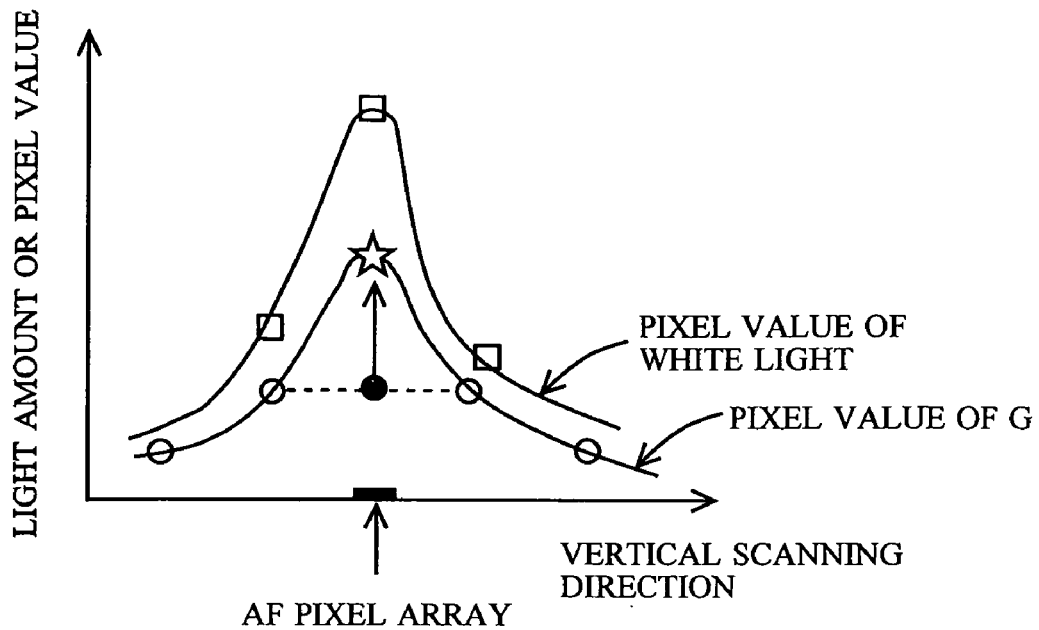
FIG. 4 is a longitudinally-sectional view of the image structure of longitudinal five pixels containing a convex structure.

FIG. 4 shows an example of the image structure with which the effect of this embodiment is exerted. FIG. 4 is a longitudinally-sectional view of the image structure of longitudinal five pixels containing a convex structure (bright line or points). In FIG. 4, the abscissa axis represents the vertical scanning direction (y-coordinate), and the ordinate axis represents the light amount or the pixel value. The convex structure is located on the AF pixel array arranged in the horizontal scanning direction.

Marks ○ in FIG. 4 represent the pixel values picked up by the pixels of G. However, since no pixel of G exists at the position of the AF pixel, no pixel value of G is obtained at that position. Accordingly, when the convex structure is located at the position of the AF pixel, the convex structure of FIG. 4 cannot be reproduced from only the pixel values of the pixels in the neighborhood of the AF pixel. Actually, in step S12, the pixel value of G (a mark ● in FIG. 4) calculated through the interpolation at the position of the AF pixel by using the pixel values of the pixels of G in the neighborhood of the AF pixel does not reproduce the convex structure.

On the other hand, a pixel value of white light is obtained at the position of the AF pixel. However, the normal pixel receives light passing through the overall area of the pupil, however, the AF pixel receives only light passing through the right side or the left side of the pupil, so that the pixel value of normal white light (light passing through the overall area of the pupil) is calculated by adding the adjacent AF pixels which are different in pupil split (equation (14)).

Furthermore, the other color components R and G are interpolatively generated at the position of the pixel of G in the neighborhood of the AF pixel, and the weighted sum of the color components R, G and B is calculated, whereby the pixel value of the white light can be calculated with sufficient precision in many cases (equation (11) and equation (13)).

Marks □ in FIG. 4 represent the distribution of the thus-obtained pixel values of white light. In many cases, the high frequency component of the pixel value of white light and the high frequency component of the pixel value of the color component G are proportional to each other, and thus the high frequency component calculated from the pixel value of white light has information of the convex structure component of the pixel values of G. Accordingly, the high frequency component of the pixel value of G is calculated based on the high frequency component of the pixel values of white value, and the value concerned is added to the data of the mark ●, whereby the pixel value of a mark ◇ is obtained and the convex structure is reproduced (equation (21)).

Figure 5:
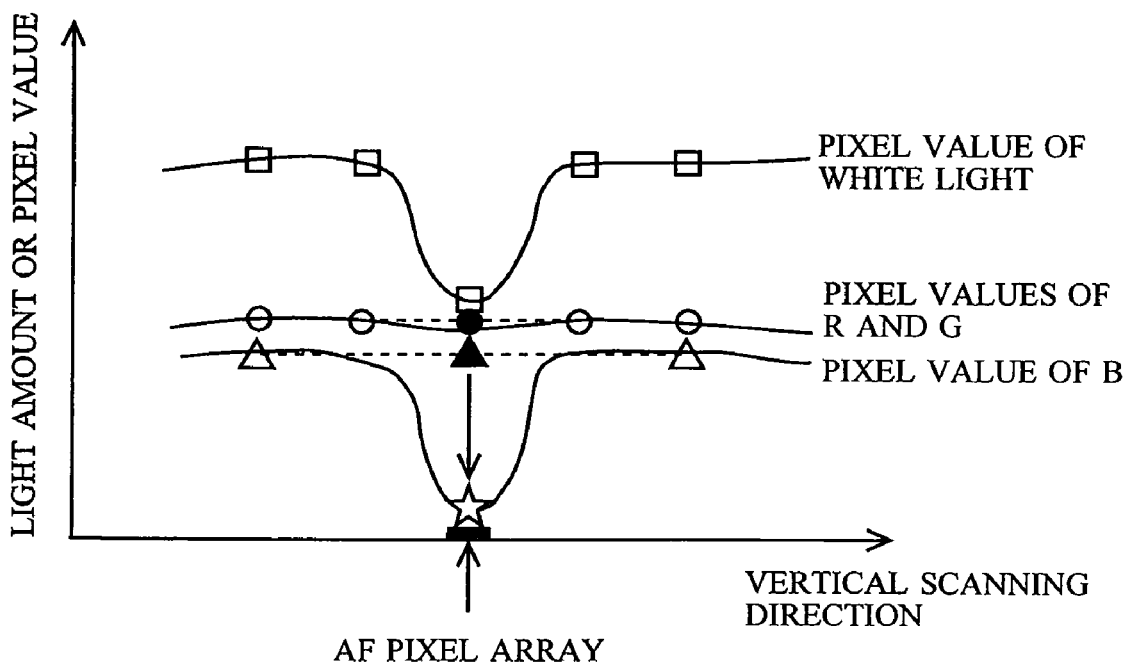
FIG. 5 is a longitudinally-sectional view of the image structure of an image having a minute color structure.
Figure 6:
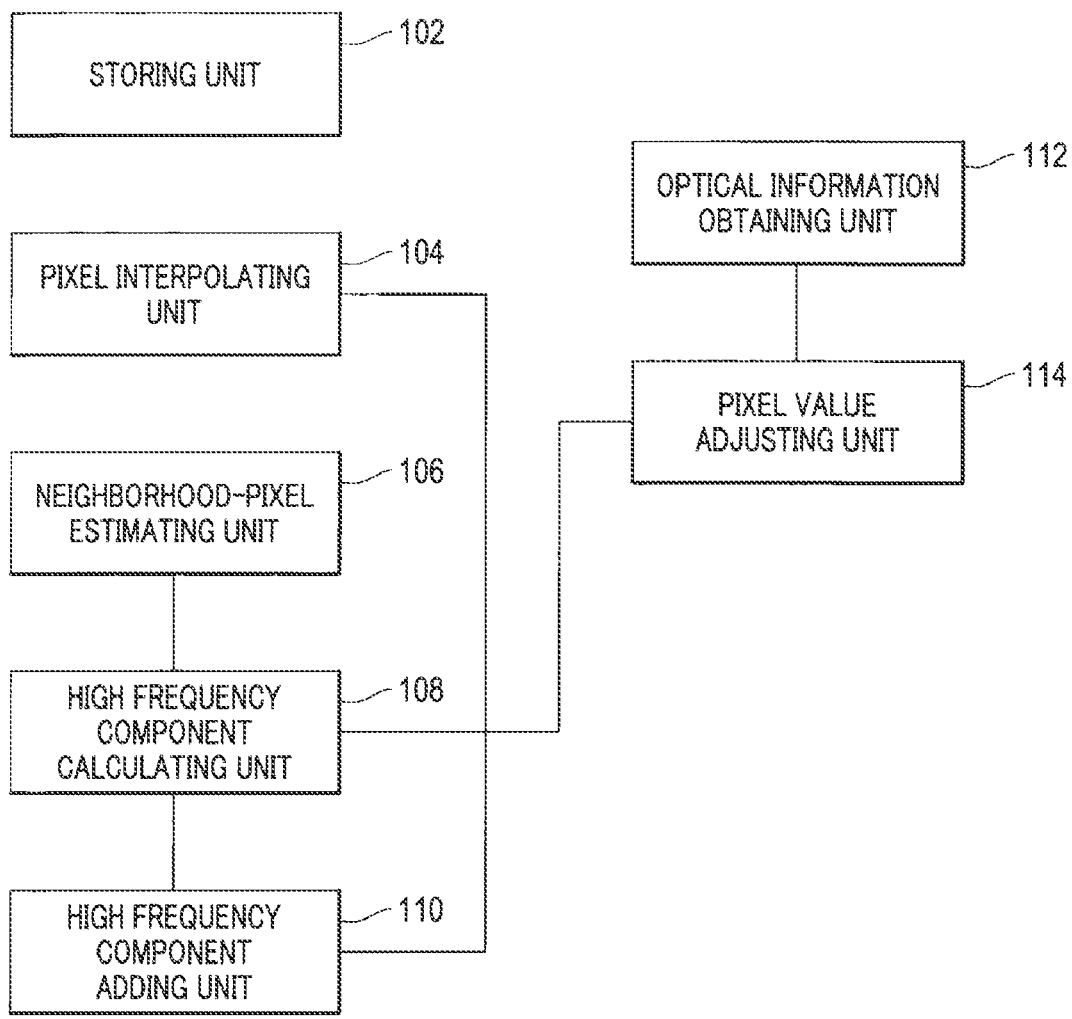
FIG. 6 is a block diagram of an image processing device according to an embodiment of the disclosure.
Figure 7:
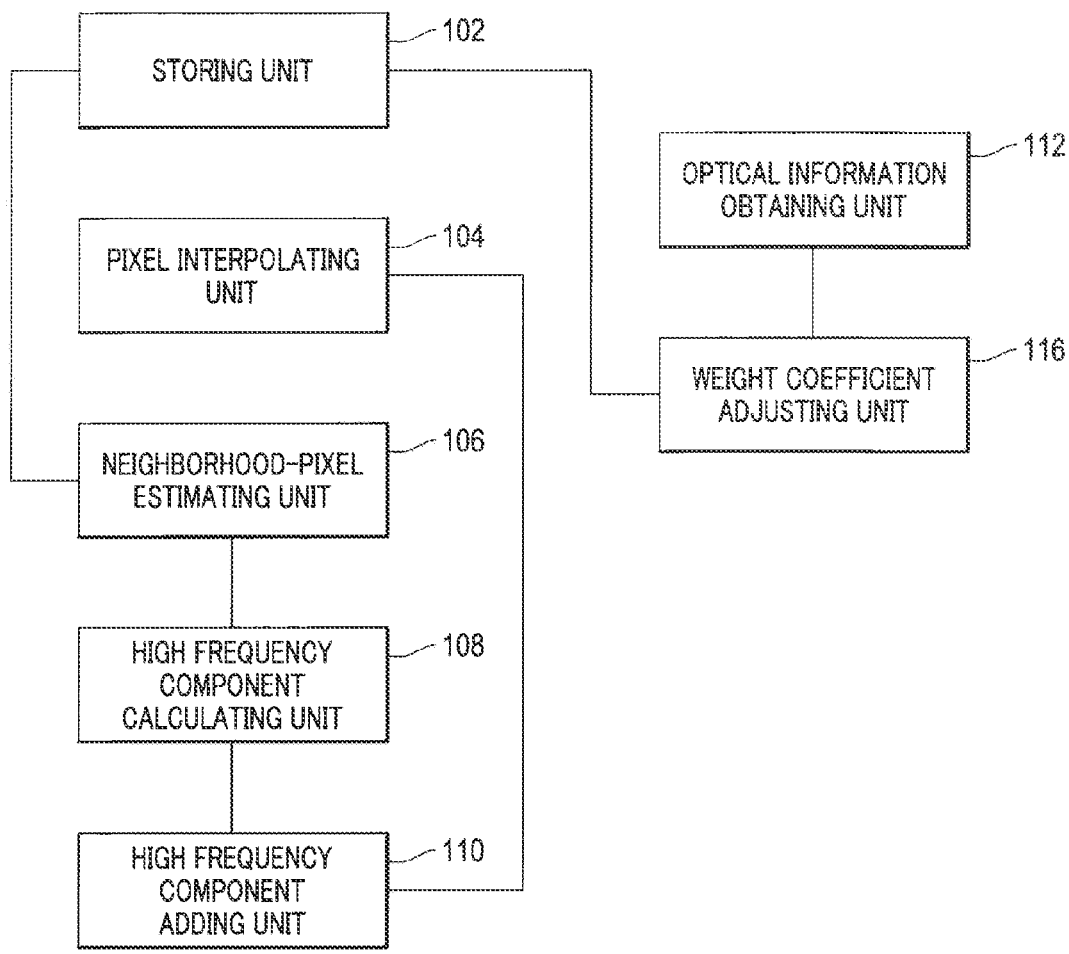
FIG. 7 is a block diagram of an image processing device according to an embodiment of the disclosure.

FIG. 5 shows an example in which the color structure is also properly reproduced for even an image having a minute color structure according to this embodiment. In this color structure, a yellow line is located at the positions where the AF pixels are arranged, and the surrounding thereof is white. The pixel values of the color component B are small at the positions where the AF pixels are arranged because the yellow line is located at these positions, and the pixel values of the color components R and G are substantially uniform. Marks ○ represent the pixel values of the pixels of G, and marks Δ represent the pixel values of the pixels of B. The mark ● represent the pixel values which is interpolatively generated from the pixel values of G through the processing of step S12, and the mark ▲ represents the pixel value which is interpolatively generated from the pixel values of B through the processing of step S12. As shown in FIG. 5, the marks ● and ▲ have no concave structure. On the other hand, the marks □ represent pixel values of white light determined in steps S15 and S16, and the distribution thereof has a concave structure. Accordingly, as described above, the pixel values of B must be set to small values at the positions of the AF pixel array as described above, and thus the pixel value of the mark ▲ is incorrect.

Figure 3:
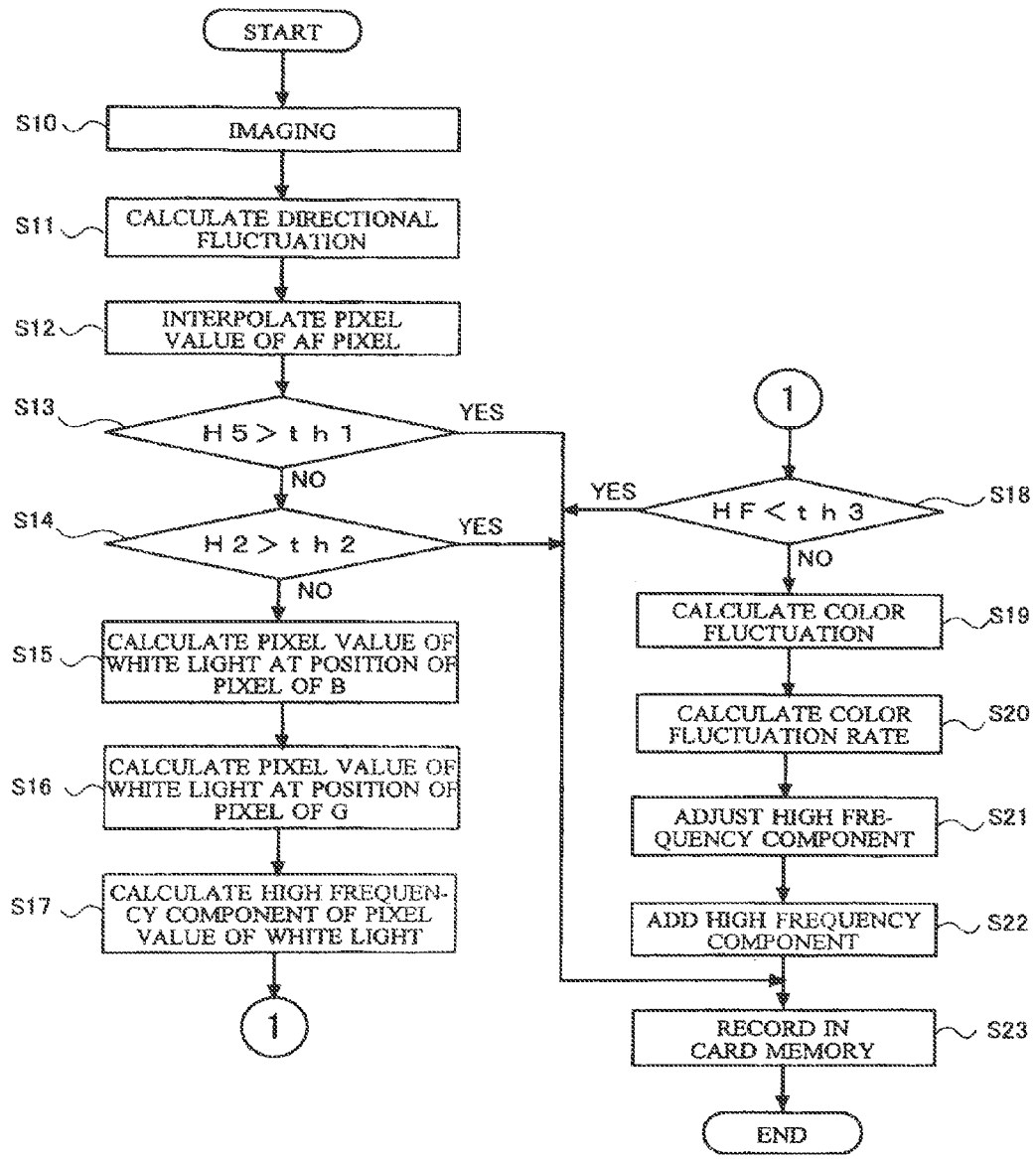
FIG. 3 is a flowchart showing image processing of the electronic camera 10 according to the embodiment.

Therefore, in step S19 and step S20 of FIG. 3, the dispersion of the pixel values of the pixels of the respective color components R, G and B in the neighborhood of the AF pixel is determined, and the color fluctuation rate at which each color component varies is calculated. In many cases, the color structure has some spreading, and thus it has no problem to set the color fluctuation rate determined in the neighborhood of the AF pixel to the color fluctuation rate at the position of the AF pixel. However, the positions of the pixels of the color components R, G and B are different from one another, and thus when the dispersion of the pixel values is merely calculated with respect to each of R, G and B and then these dispersions of R, G and B are compared with one another, it greatly suffers the effect caused by the difference of the image structure in accordance with the position. Therefore, when the variations of R and G are compared with each other, the dispersion (VGr) of the pixel values of G interpolated at the positions of the pixels of R is compared with the dispersion (VR) of the pixel values of the pixels of R, thereby suppressing the effect caused by the position (equation (16)). That is, the variation (VR2) of the pixel values of R: the variation (VG2) of the pixel values of G=VR:VGr. Likewise, the variation (VB2) of the pixel values of B: the variation (VG2) of the pixel values of G=VB:VGb.

These relationships are integrated to obtain the equation (18). If the variation (VW) of the pixel values of white light is estimated as the equation (19), the color fluctuation rate $K_{WB}$ of the pixel values of B and the color fluctuation rate $K_{WG}$ of the pixel values of G to the variation (VW) of the pixel values of white light can be calculated from the equation (20). In step S21, the high frequency component HF of the pixel values of white light is adjusted based on the color fluctuation rates $K_{WB}$ and $K_{WG}$, whereby the high frequency component HFG of the pixel values of G and the high frequency component HFB of the pixel values of B can be calculated.

With respect to the image shown in FIG. 5, the color fluctuation rate $K_{WB}$ of the pixel values of B to the pixel values of white light is near to 1, and the pixel value (the mark ◇ in FIG. 5) obtained by adding the high frequency component HFB to the pixel value of B of the mark ▲ which is calculated through the interpolation correctly reproduces the concave structure. On the other hand, the color fluctuation rate $K_{WG}$ of the pixel values of G to the pixel values of white light is near to zero and thus the high frequency component HFG is hardly added to the pixel value of B of the mark ● which is determined through the interpolation, so that the pixel values have no concave structure and it keeps a fixed value structure.

In the equation (14) of the step S17, the pixel value of white light at the position of each AF pixel is calculated by using the pixel values of the AF pixels adjacent in the array direction of the AF pixels, so that the resolution in the array direction of the pixel values of white light is lost. Accordingly, when there is a strong fluctuation in the array direction, the calculation of the high frequency component is inaccurate. However, in such a case, the addition of the high frequency component is stopped in step S13.

Furthermore, even when there is no fluctuation in the array direction of the AF pixel, the high frequency component of the pixel values of white light has a slight error due to the displacement between the weighted sum of the spectroscopic characterizations of the pixels of the respective color components and the spectroscopic characterization of the AF pixel or the like. When the image has no great fluctuation in the vertical scanning direction (the direction intersecting to the array direction of the AF pixels), the precision of the interpolation value is sufficient without adding any high frequency component, and there is a risk that a false structure would occur due to an error if the high frequency component is added. Therefore, in step S14, the addition of the high frequency component is suppressed in such a case. Furthermore, when the calculated high frequency component is sufficiently small, the precision of the interpolation value is sufficient without adding any high frequency component, and there is a risk that a false structure would occur due to an error if the high frequency component is added. Therefore, in step S18, the addition of the high frequency component is suppressed in such a case.

In the equation (14) of the step S17, the pixel value of normal white light (light passing through the overall area of the pupil) is determined by calculating the sum of the pixel values of the AF pixels which are different in pupil split. However, the sum of the AF pixel values is regarded as the pixel value of normal white light only when the AF pixels strictly split the pupil half-and-half.

On the other hand, there is a case where the situation is different from the above case in accordance with the design of the AF pixels. For example, there is a case where the AF pixels are designed so that they do not receive light at the intermediate portion of the pupil, but receive light at about 30% of the right side and light at about 30% of the left side in the overall area of the pupil. According to this type of AF pixels, the phase difference of the image is increased, and high AF precision (when the F-value is equal to or less than a predetermined value) can be implemented.

When the above AF pixels are adopted, the sum of the pixel values of the AF pixels calculated according to the equation (14) is proportional to the pixel value of normal white light, however, the proportional relationship concerned is varied in accordance with the conditions of the imaging optical system (F-value, PO value, pixel positions for focus detection, etc.). Therefore, the pixel value of normal white light at the AF pixel position may be determined by obtaining the imaging optical condition and adjusting the sum of the pixel values of the AF pixels in accordance with the imaging optical condition. Alternatively, an estimation value of a white color component in the neighborhood of the AF pixel may be adjusted to correspond to the sum of the pixel values of the AF pixels by adjusting WR, WG and WB which are weight coefficients for estimating the white color component in the neighborhood of the AF pixel. This method is adaptable to the fact that the proportional relationship between the sum of the pixel values of the AF pixels and the pixel value of normal white light is slightly dependent on the wavelength of incident light. Alternatively, the above two types of adjustments may be combined.

Even when the AF pixels are designed so as to split the pupil half-and-half, there is a case where this design is not strictly implemented because of structural restriction of the AF pixels or the manufacturing error. However, the above adjustment is effect to such a case.

When the AF pixel value is saturated, the white color component estimated on the basis of the AF pixel value is smaller than the actual value, and thus the high frequency component calculated according to the equation (15) is smaller than the actual value. In this case, by adding particularly a negative high frequency component to the interpolation value, a false image structure may be generated. Therefore, when the AF pixel value is saturated and the high frequency component is negative, it is desired to suppress addition of the high frequency component.

When the pixel value of the pixel in the neighborhood of the AF pixel is saturated, the neighboring white color component estimated on the basis of the pixel value concerned is smaller than the actual value, and thus the high frequency component calculated according to the equation (15) is larger than the actual value. In this case, by adding particularly a positive high frequency component to the interpolation value, a false image structure may be generated. Therefore, when the pixel value of the pixel in the neighborhood of the AF pixel is saturated and the high frequency component is positive, it is desired to suppress addition of the high frequency component.

In this embodiment, the array direction of the AF pixels is set to the horizontal scanning direction, however, the present invention is not limited to this embodiment. For example, the AF pixels may be arranged in the vertical scanning direction or in another direction.

Furthermore, in this embodiment, each of the AF pixels serves as a focus detecting pixel for subjecting a light flux from the left side or the right side to pupil split. However, the present invention is not limited to this embodiment, and each of the AF pixels may serve as a focus detecting pixel for subjecting light fluxes from the left side and the right side to pupil split. The present invention is also applicable to a program for implementing the processing of the image processing device according to this invention in a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device comprising:
a storing unit storing a position of a focus detecting pixel of an image-capturing sensor which contains a plurality of color pixels having spectroscopic characterizations corresponding to a respective plurality of color components, the focus detecting pixel having a spectroscopic characterization different from the spectroscopic characterizations of the plurality of color pixels;
a pixel interpolating unit generating an interpolation color pixel value of the focus detecting pixel by using a pixel value of one of the plurality of color pixels in a neighborhood of the focus detecting pixel in an image generated by the image-capturing sensor;
a neighborhood-pixel estimating unit calculating an estimation pixel value corresponding to a pixel value of one of the plurality of color pixels in the neighborhood of the focus detecting pixel if the pixel value of one of the plurality of color pixels were to have the same spectroscopic characterization as the focus detecting pixel;
a high frequency component calculating unit calculating a high frequency component of the image by using a pixel value of the focus detecting pixel and the estimation pixel value; and
a high frequency component adding unit adding the interpolation color pixel value with the high frequency component to calculate the pixel value of the focus detecting pixel for imaging.

2. The image processing device according to claim 1, wherein
the storing unit stores weight coefficients for representing the spectroscopic characterizations of the focus detecting pixel by a weighted sum of the respective spectroscopic characterizations of the plurality of color pixels, and
the neighborhood-pixel estimating unit calculates the weighted sum by using the weight coefficients and the pixel values of the plurality of color pixels in the neighborhood of the focus detecting pixel, thereby calculating the estimation pixel value.

3. The image processing device according to claim 1, wherein the neighborhood-pixel estimating unit calculates a different pixel value corresponding to a pixel value of the one of the plurality of color pixels in the neighborhood of the focus detecting pixel if it were to have color components different from its actual color component, and calculates the estimation pixel value by using the different pixel value and the pixel value of the one of the plurality of color pixels in the neighborhood of the focus detecting pixel.

4. The image processing device according to claim 1, wherein the focus detecting pixel is one of a plurality of focus detecting pixels which subjects an imaging optical system to pupil split, and
the high frequency component calculating unit uses, as the pixel value of the focus detecting pixel, an addition pixel value obtained by adding the pixel value of the focus detecting pixel with a pixel value of another focus detecting pixel having pupil split different from pupil split of the focus detecting pixel.

5. The image processing device according to claim 1 wherein the high frequency component calculating unit further comprises a color fluctuation calculating unit calculating a color fluctuation value corresponding to a magnitude of a fluctuation of each of the plurality of color pixel values that corresponds to each of the respective plurality of color components by using the plurality of color pixels in the neighborhood of the focus detecting pixel, and the high frequency component calculating unit calculates a high frequency component of the focus detecting pixel by using the color fluctuation value.

6. The image processing device according to claim 5, wherein
the high frequency component calculating unit calculates a color component fluctuation rate corresponding to a rate of the color fluctuation value of one color component and a comprehensive value of the color fluctuation values of all the color components, adjusts the high frequency component of the image in accordance with the color component fluctuation rate, and calculates a high frequency color component corresponding to the high frequency component of the image if the focus detecting pixel were to have a spectroscopic characterization of the one color component.

7. The image processing device according to claim 5, wherein the color fluctuation calculating unit calculates a color fluctuation value of a first color component by determining a dispersion of pixel values of the plurality of color pixels having the first color component in the neighborhood of the focus detecting pixel, and determines a dispersion of pixel values of the plurality of color pixels having a second color component in the neighborhood of the focus detecting pixel by interpolating pixel values of the plurality color pixels having the second color component in the neighborhood of the focus detecting pixel at the respective pixel positions of the plurality of color pixels having the first color component in the neighborhood of the focus detecting pixel, thereby calculating a color fluctuation value of the second color component, wherein a pixel density of the plurality of color pixels having the second color component is larger than a pixel density of the plurality of color pixels having a first color component.

8. The image processing device according to claim 1, wherein the high frequency component adding unit suppresses an addition of the high frequency component when a magnitude of the high frequency component is smaller than a predetermined value.

9. The image processing device according to claim 8, wherein the predetermined value is a maximum value of an estimation error of a high frequency component in a flat area in which a variation rate of pixel values of the plurality of color pixels is small.

10. The image processing device according to claim 1, further comprising:
a directional fluctuation calculating unit calculating, by using pixel values of the plurality of color pixels in the neighborhood of the focus detecting pixel, a directional fluctuation corresponding to a variation rate of the pixel values of the plurality of color pixels in the neighborhood of the focus detecting pixel with respect to each of a plurality of directions, wherein
the pixel interpolating unit calculates the interpolation color pixel value from a pixel value of a pixel located in a direction having a smallest directional fluctuation with respect to the focus detecting pixel.

11. The image processing device according to claim 10, wherein the focus detecting pixel is one of a plurality of focus detecting pixels one-dimensionally arranged in a predetermined array direction, and
the high frequency component adding unit suppresses an addition of the high frequency component when the directional fluctuation in a direction intersecting the array direction is smaller than a predetermined value.

12. The image processing device according to claim 10, wherein the focus detecting pixel is one of a plurality of focus detecting pixels one-dimensionally arranged in a predetermined array direction, and
the high frequency component adding unit suppresses an addition of the high frequency component when the directional fluctuation in the array direction is larger than a predetermined value.

13. The image processing device according to claim 1, further comprising:
an optical information obtaining unit obtaining optical information concerning an optical system used to shoot the image; and
a pixel value adjusting unit adjusting at least one of the pixel value of the focus detecting pixel and the estimation pixel value in accordance with the optical information, wherein
the high frequency component calculating unit calculates the high frequency component of the image by using the pixel value of the focus detecting pixel and the estimation pixel value at least one of which is adjusted by the pixel value adjusting unit.

14. The image processing device according to claim 2, further comprising:
an optical information obtaining unit obtaining optical information concerning an optical system used to shoot the image; and
a weight coefficient adjusting unit adjusting the weight coefficients in accordance with the optical information.

15. The image processing device according to claim 13, wherein
the optical information obtaining unit obtains at least one of an F-value, a PO value and a focus detecting pixel position of the optical system.

16. The image processing device according to claim 1, further comprising:
a saturation determining unit determining one of saturation of the pixel value of the focus detecting pixel and the pixel value of the one of the plurality of color pixels in the neighborhood of the focus detecting pixel, wherein
the high frequency component adding unit suppresses an addition of the high frequency component in accordance with a determination result of the saturation determining unit.

17. The image processing device according to claim 16, wherein the high frequency component adding unit suppresses an addition of the high frequency component when it is determined by the saturation determining unit that the pixel value of the focus detecting pixel is saturated and the high frequency component is negative.

18. The image processing device according to claim 16, wherein the high frequency component adding unit suppresses an addition of the high frequency component when it is determined by the saturation determining unit that the pixel value of the one of the plurality of color pixels in the neighborhood of the focus detecting pixel is saturated and the high frequency component is positive.

19. An image-capturing device comprising:
an image-capturing sensor; and
the image processing device according to claim 1.

20. A non-transitory computer readable medium storing an image processing program which causes a computer to implement a calculation of the image processing device according to claim 1.

* * * * *